United States Patent [19]

Kuhn, Jr.

[11] 4,220,933
[45] Sep. 2, 1980

[54] BAFFLE/NOZZLE ARRAY FOR CYLINDRICAL LASERS

[75] Inventor: Ralph F. Kuhn, Jr., Calabasas, Calif.

[73] Assignee: The United States of America as represented by the Secretary of the Air Force, Washington, D.C.

[21] Appl. No.: 926,471

[22] Filed: Jul. 20, 1978

[51] Int. Cl.$^2$ .............................................. H01S 3/02
[52] U.S. Cl. .......................... 331/94.5 D; 331/94.5 G
[58] Field of Search .................... 331/94.5 D, 94.5 G, 331/94.5 PE, 94.5 T; 330/4.3

[56] References Cited

U.S. PATENT DOCUMENTS 4,011,522 3/1977 Falk ................................ 331/94.5 G Primary Examiner—James W. Davie
Attorney, Agent, or Firm—Joseph E. Rusz; Jacob N. Erlich

[57] ABSTRACT

A nozzle/baffle array for use within the gain generator of a cylindrical laser. The nozzle/baffle array is made of a nozzle assembly and a plurality of baffles. The baffles extend in the radial direction from the centerbody of the cylindrical laser supporting the nozzle assembly circumferentially about the centerbody. As a consequence of the novel arrangement and design of the baffles, the baffles provide a spring support for the nozzle assembly while simulataneously supporting the nozzle assembly in great alignment accuracy permitting adequate thermal growth to take place between the nozzle assembly and the centerbody of the laser.

10 Claims, 5 Drawing Figures

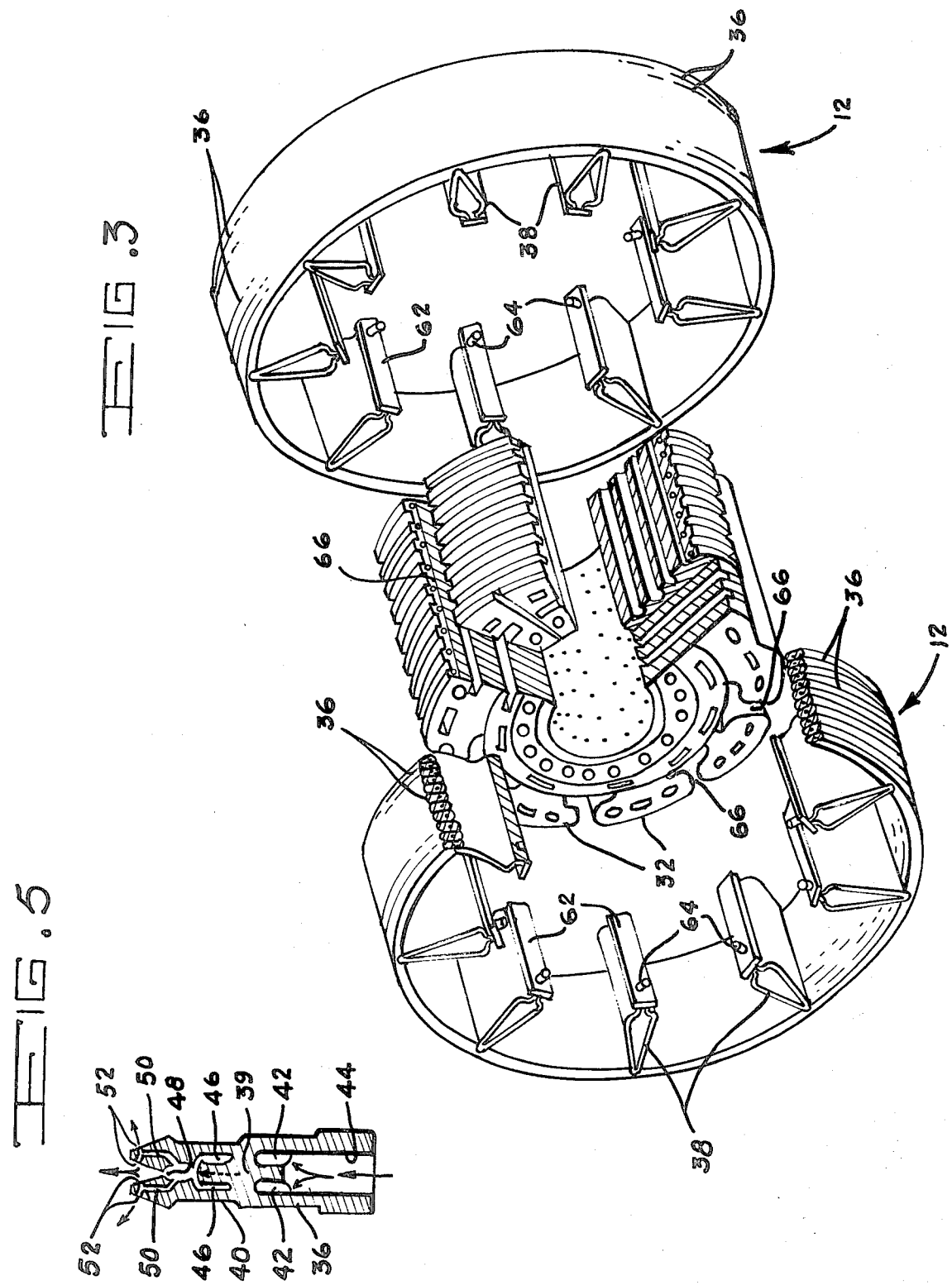

BAFFLE/NOZZLE ARRAY FOR CYLINDRICAL LASERS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to cylindrical lasers, and, more particularly to the mounting of laser nozzles to the injector centerbody manifold assembly of a cylindrical laser.

The development of the laser has created a new area of technology which finds application in many systems already in existance today. For example, lasers can be found in the areas of optical communications, holography, medicine, cutting, calculating and in radar. The utilization of the laser in such areas is in many instances dependent upon the amplification of the existing laser radiation.

In certain areas, such as in optical communications or optical radar, it is necessary to greatly amplify the initial radiation power produced by the laser. One laser which produces a high output power is the cylindrical chemical laser. In such a laser, or in most conventional lasers, the "optical or resonant cavity" of the laser typically comprises plane parallel or curved mirrors located at right angle to the axis of the cylindrical region. The cylindrical region may be a gas envelope or the like in which the laser action takes place. For laser operation, one of the mirrors is required to be partially transmissive in order to extract a useful beam coherent light from the "optical cavity".

One problem which exists in the cylindrical lasers is that the nozzle blade must operate at a temperature greater than the centerbody manifold assembly on which the nozzle blades are mounted and from which they are fed. This temperature difference can be greater than 500° F. Such a condition results in high stress and low cycle life. Stress calculations indicate a rigid support system would result in a less than 50 cycle life of the laser. It is therefore essential to develop a mounting arrangement for the nozzle blades of cylindrical lasers which can eliminate these high stress and low cycle life conditions.

SUMMARY OF THE INVENTION

The instant invention overcomes the problems encountered in the past and as set forth in detail hereinabove by providing a baffle/nozzle array for use within a cylindrical laser. The baffle/nozzle array of the instant invention provides a spring support, which while supporting the nozzle blades in accurate alignment allows them to expand radially with sufficient freedom to eliminate the inherent high stress conditions of the past.

In a typical cylindrical chemical laser, the baffle/nozzle array of this invention circumferentially surrounds the centerbody of the laser. The baffle/nozzle array is made up of two main components; i.e., a plurality of nozzle blades of continuous-hoop construction operably attached to a plurality of radially extending baffles which are attached at one end to the centerbody of the laser and at the other end to the nozzle blades. Generally, for each module of the centerbody of a cylindrical laser two such baffle/nozzle array are utilized. Each nozzle blade of the baffle/nozzle array of this invention contains therein a pair of coolant channels as well as a manifold which allows the propellant to be dispersed from the nozzle blade into the optical cavity of the laser.

Each baffle is made up of a pair of baffle halves which are so constructed so as to allow the propellant to be passed from the centerbody of the laser to the nozzle blades. The novel attachment of the nozzle blades to the centerbody of the laser allows for a differential thermal growth to take place between the nozzle blades and the centerbody of the laser without introducing unduly high loads to the blades. The selected baffle configuration acts as a flexure allowing for such radial growth to take place. Consequently, the spring-like support of each baffle supports the blades in great alignment accuracy and allows them to expand radially.

It is therefore an object of this invention to provide a baffle/nozzle array which provides support of the nozzle blades of a cylindrical laser about the centerbody of the laser.

It is another object of this invention to provide a baffle/nozzle array which allows radial expansion of the nozzle blades to take place.

It is still a further object of this invention to provide a baffle/nozzle array which substantially eliminates the high stress and low cycle life which occurred in the nozzle blade support configurations of the past.

It is still another object of this invention to provide a baffle/nozzle array which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWINGS

FIG. 3 is a pictorial representation of a single module of the centerbody of the cylindrical laser shown in FIGS. 1 and 2 in which the baffle/nozzle array of this invention is illustrated in exploded fashion;

FIG. 5 is a cross sectional view of a nozzle blade of the baffle/nozzle array of this invention.

DETAILED DESCRIPTION OF THE PREFERRED EMBODIMENT

Figure 1:
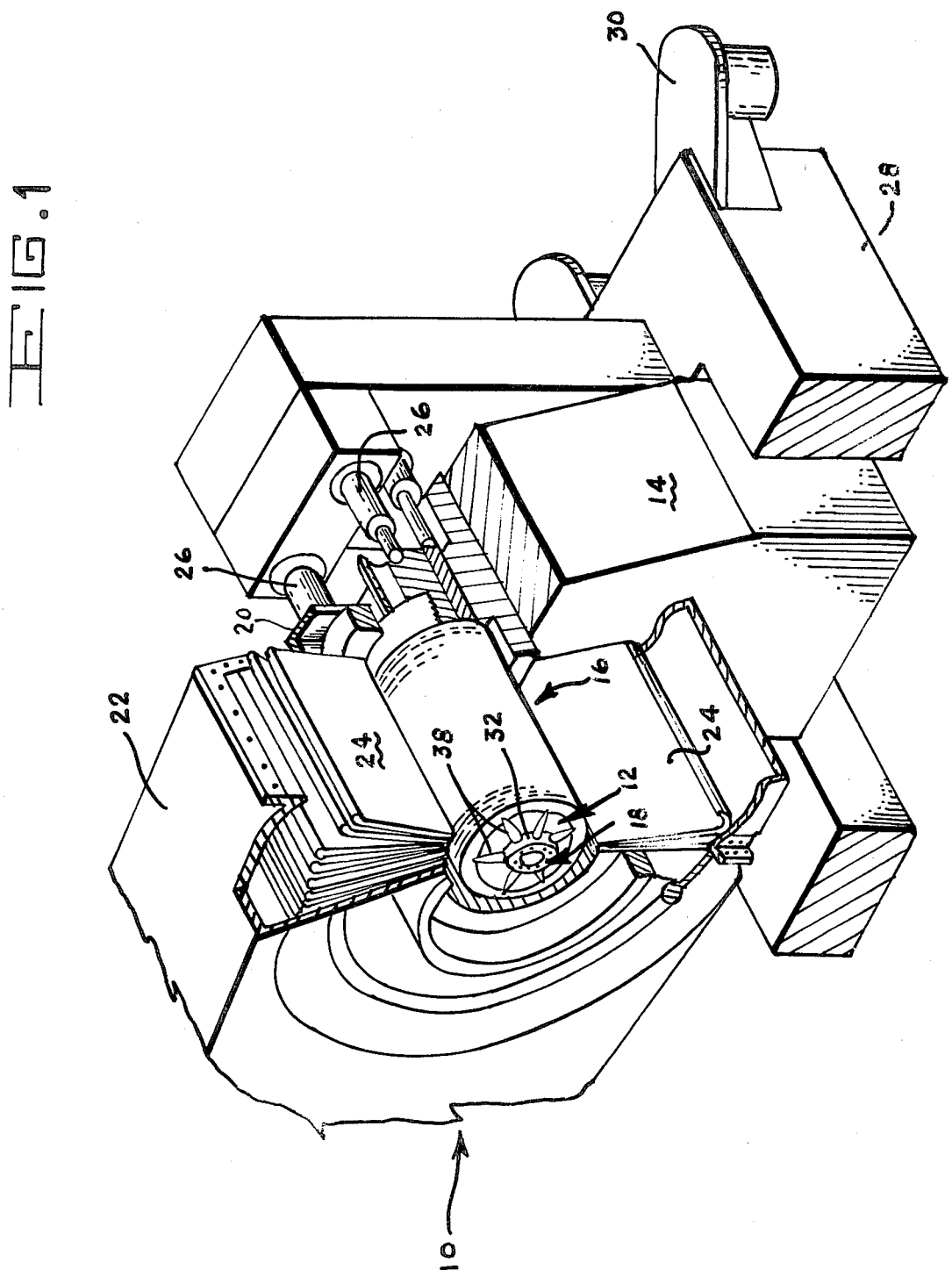
FIG. 1 is a pictorial representation of a cylindrical chemical laser in which the baffle/nozzle array of this invention is utilized and wherein the cylindrical laser is shown partially segmented.

Reference in now made to FIG. 1 of the drawing which sets forth in pictorial fashion a typical cylindrical chemical lasers 10 in which the baffle/nozzle array 12 of the instant invention is utilized. Cylindrical laser 10 as shown in FIG. 1 of the drawing is generally made up of a support 14 to which is secured in cantilevered fashion the gain generator 16 of laser 10. Gain generator 16 is formed of an elongated, cylindrically-shaped injector centerbody manifold assembly 18, the baffle/nozzle array 12 of this invention and a pair of reflector elements 20 at each end thereof (only one being shown in the drawing) to form the "optical cavity" of the laser. In addition, a removable housing 22 encompasses gain generator 16 and provides the diffuser vanes 24 for laser 10. The other conventional elements which make up cylindrical laser 10 are shown pictorially in FIG. 1 of the drawing and designated as mirror mounts 26 optical bench 28 and isolator 30.

Figure 2:
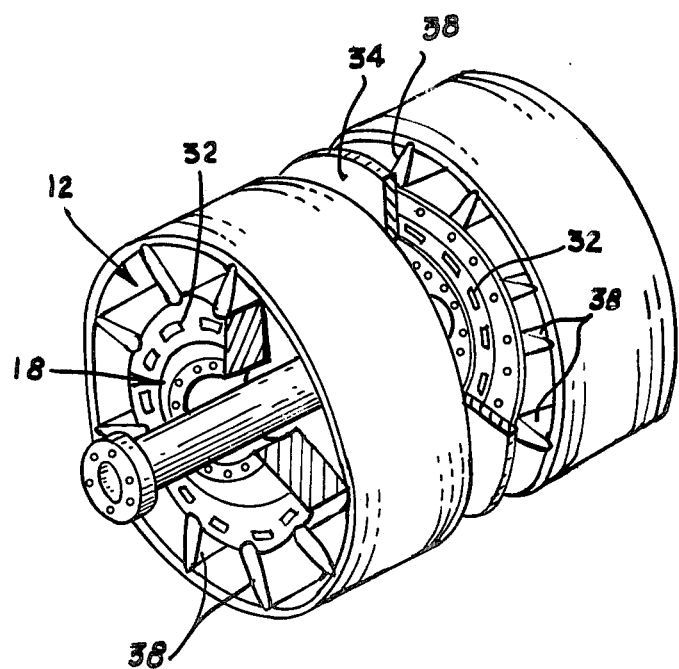
FIG. 2 is a pictorial representation of the centerbody of a typical cylindrical laser to which is attached the baffle/nozzle array of this invention.

As shown in FIG. 2 of the drawing, centerbody manifold assembly 18 is constructed of a plurality of modules 32 secured in the axial direction to one another. The centerbody manifold assembly 18 not only acts as a support or a "backbone" for gain generator 16 but also as the axial manifold for supplying propellant to the components of laser 10. In centerbody manifold assembly 18, propellants flow along the device through axial feed passages, then outwards thru radial feed passages to the components of laser 10. Since the oxidizer is the most hazardous propellant used, it is placed in the center of laser 10 in order to minimize sealing requirements. After passing axially thru the central manifold the oxidizer goes radially outward through sonic orifices, and then out through the injector face. Each module 32 of centerbody manifold assembly 18 is sealed from the adjacent module 32 by means of separator plates 34. Surrounding each module 32 is the baffle/nozzle array 12 of the instant invention.

Figure 4:
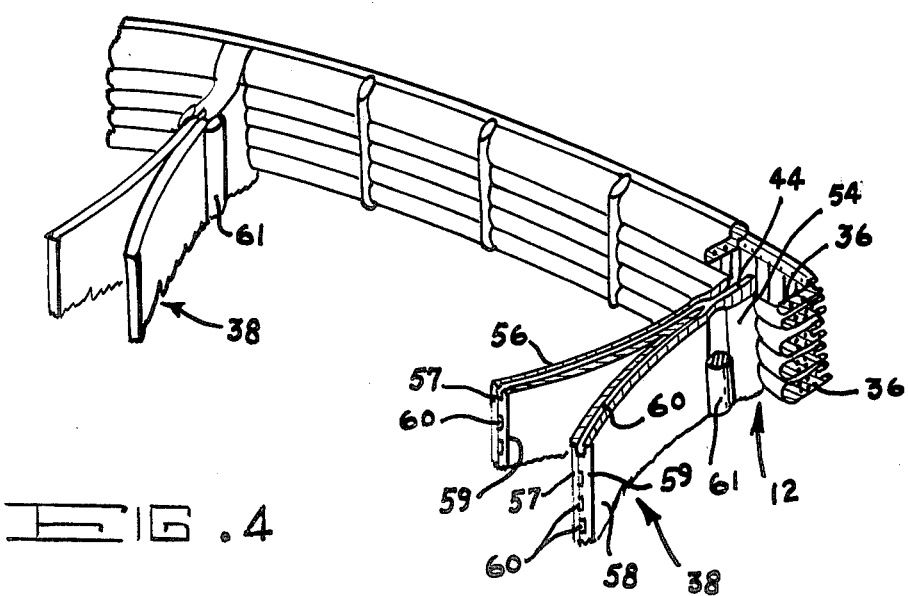
FIG. 4 is a pictorial representation of the baffle/nozzle array of this invention shown in segmented fashion and partly in cross section.

As thus illustrated in FIGS. 3 and 4 of the drawing, baffle/nozzle array 12 of this invention is made up of a plurality of nozzle blades 36, preferably 32 in number, attached to a plurality of baffles 38, preferably 9 in number. Two such baffle/nozzle arrays 12 are generally utilized for each module 32, one array 12 being installed from each end of the centerbody manifold assembly 18. By sub-dividing array 12 in this manner, schedule risk is minimized in the event any damage is incurred during manufacturing or handling of the laser. Also, such a sub-division allows a greater number of propellant inlet points, thus reducing the inlet hole diameter and, consequently the diameter of the centerbody manifold assembly of laser 10.

Each nozzle blade 36 is formed of a continuous hoop construction to provide as near as possible a circumferential homogenous lasing medium to the optical cavity of laser 10. Consequently, blades 36 are capable of expanding diametrically as well as axially as their temperature increases during laser operation. Since the centerbody manifold assembly 18 of laser 10 remains virtually at room temperature during operation of the laser, blades 36 must be attached to the modules 32 of centerbody manifold assembly 18 to allow for the differential thermal growth between the blades 36 and the modules 32 without introducing high loads into the blades. Baffles 38, set forth in detail hereinbelow, act as a flexure allowing for such radial growth.

Reference is now made to FIGS. 4 and 5 of the drawing for a more detailed description of the baffle/nozzle array 12 of this invention. The nozzle portion of the array 12 of this invention is composed of a nozzle assembly made up of a plurality of nozzle blades 36 which are joined in a hoop fashion about each module 32 as shown in FIGS. 2 and 3. As set forth hereinabove a pair of baffle/nozzle arrays 12 are mounted circumferentially about each module 32. Although the number of nozzles blades 36 may vary in each laser, optimum results have been obtained with 32 such nozzle blades 36. Each pair of nozzle blade assemblies is attached to a plurality of radially extending baffles 38 in a manner to be set forth hereinbelow. Although not limited thereto, nine such baffles 38 for each baffle/nozzle array 12 has provided for excellent laser operation.

Referring more specifically to FIG. 5 of the drawing, eahc blade 36 is made with an Inconel 625 core 39 and an electrodeposited nickel closure 40. The blades 36 are fully regeneratively cooled. Two coolant channels 42 per blade 36 are located near the leading edge thereof. Cavity fuel passes from baffle 38 through inlet channel 44 into coolant channel 42, flows halfway across the span of blade 36, and then into the injection manifold 46 and out the throat 48. Flow also passes from injection manifold 46 into two trip manifolds 50 and out trip holes 52. The metering orifices between the coolant or distribution channels and the injection manifold are programmed to obtained uniformed flow distribution across blade 36. This programming takes the form of varying the hole spacing at a constant hole diameter.

As best shown in FIG. 4 of the drawing, blades 36 are secured to baffle 38 by means of a T-shaped abutment 54 located adjacent input cahnnel 44. Each baffle 38 is made up of two halves 56 and 58 which in turn are constructed of two sheets 57 and 59 of any suitable material such as beryllium copper or stainless steel in which the cavity fuel flow channels 60 are machined into one sheet 59 after which the second sheet 57 is brazed or welded on as a closeout. The halves 56 and 58 of each baffle 38 are then joined and brazed or welded together adjacent inlet channel 44 of blades 36. An electroformed nickel closure 61 fixedly secures each baffle 38 to the nozzle blades 36. A copper alloy was chosen in the instant invention because of its relatively low modulus of elasticity, which reduces its spring rate and, consequently, the load transferred to blades 36.

There are an equal number of cavity fuel channels 60 located within each baffle half 56 and 58 corresponding to the number of blades 36 utilized in each blade assembly. In normal laser operation, there are 32 cavity fuel channels 60 per baffle half, or one per nozzle blade. The use of one channel 60 per blade 36 means the propellant need not flow axially at the baffle-to-blade joint, thereby reducing pressure losses in this area. Channels 60 are 0.050 inches wide by 0.030 inches deep with an average propellant Mach number of 0.3. Both the hot-gas and cool-side wall thicknesses are 0.015 inch. This results in a maximum baffle hot-gas wall temperature of 330° F., which is well below the presently acceptable 500° F. safe operating temperature of berylium copper in a $C_2H_4/NF_3$ combustion products environments.

As illustrated in FIG. 3 of the drawing, each baffle 38 has located on an end 62 thereof, opposite the end to which the nozzle assembly is attached an inlet tube 64 which matingly engages a channel located within each module 32 for transfer of fuel from the module 32 to baffle 38. Each baffle/nozzle array 12 is mounted upon module 32 by a sliding engagement of end 62 of baffle 38 within a groove 66 located within module 32. Any suitable securing method such as brazing or welding can be utilized in fixedly securing baffle/nozzle array 12 to each module 32 of the cylindrical laser 10.

Although this invention has been described with reference to a particular embodiment, it will be understood that this invention is also capable of further and other embodiments within the spirit and scope of the appended claims.

I claim:

1. In a cylindrical laser having an elongated, cylindrically-shaped injector centerbody manifold made of a plurality of modules secured in the axial direction to one another, the improvement therein being in the form of at least one baffle/nozzle array operably attached to each of said modules, said baffle/nozzle array comprising a circumferential nozzle assembly and a plurality of baffles operably connected in the radial direction between said module and said nozzle assembly, said nozzle assembly being formed of a plurality of nozzle blades, each of said nozzle blades encompassing said module in a hoop-like fashion, each of said baffles being made of two parts, each of said parts being made of a material having a predetermined amount of flexibility, flow channels being formed within said two parts of said baffles and said flow channels interconnecting the center of said module to said nozzle blades whereby said baffles act as a flexure allowing for differential thermal growth to take place between said nozzle blades and said centerbody of said laser.

2. In a cylindrical laser as defined in claim 1 wherein each of said two parts of each of said baffles are constructed of two sheets of material, said flow channels being formed within one of said sheets and said other sheet acting as a closeout.

3. In a cylindrical laser as defined in claim 2 wherein the number of flow channels located within each of said baffles corresponds to the number of nozzle blades in said nozzle assembly.

4. In a cylindrical laser as defined in claim 3 wherein each of said nozzle blades has a plurality of coolant channels and a plurality of outlets therein, said coolant channels following the circumferential path of said nozzle blades and said outlets being operatively connected to said coolant channels and located substantially perpendicular thereto.

5. In a cylindrical laser as defined in claim 4 each of said nozzle blades having an abutment formed thereon, said abutment having a passageway located therein, said nozzle blades being connected to said baffles at said abutment and said passageways interconnecting said flow channels of said baffles to said coolant channels of said nozzle blades.

6. In a cylindrical laser as defined in claim 5 wherein said end of said baffles opposite the end to which said nozzle blades are attached slidingly engage said module.

7. In a cylindrical laser as defined in claim 6 wherein each of said nozzle blades are made of an Iconel 625 core and a nickel closure.

8. In a cylindrical laser as defined in claim 7 wherein said sheets of said baffle are made of beryllium copper.

9. In a cylindrical laser as defined in claim 7 wherein said sheets of said baffle are made of stainless steel.

10. In a cylindrical laser as defined in claim 8 wherein there are two baffle/nozzle arrays operably connected to each of said modules.

* * * * *